(12) United States Patent
Ruse et al.

(10) Patent No.: US 7,354,165 B1
(45) Date of Patent: Apr. 8, 2008

(54) VEHICLE MIRROR SYSTEM WITH CONTROL RISE DETENT ASSEMBLY

(75) Inventors: James A. Ruse, Allegan, MI (US); Ian Boddy, Ada, MI (US)

(73) Assignee: Magna Donnelly Mirrors North America, LLC, Kentwood, MI (US)

( * ) Notice: Subject to any disclaimer, the term of this patent is extended or adjusted under 35 U.S.C. 154(b) by 0 days.

(21) Appl. No.: 11/163,484

(22) Filed: Oct. 20, 2005

Related U.S. Application Data

(60) Provisional application No. 60/522,607, filed on Oct. 20, 2004.

(51) Int. Cl.
*B60R 1/074* (2006.01)
*G02B 5/08* (2006.01)

(52) U.S. Cl. ..................... 359/841; 248/478

(58) Field of Classification Search ............... 359/841, 359/877; 248/485, 478, 900
See application file for complete search history.

(56) References Cited

U.S. PATENT DOCUMENTS

| | | | |
|---|---|---|---|
| 4,789,232 A | 12/1988 | Urbanek | |
| 4,969,727 A | 11/1990 | Harloff et al. | |
| 5,477,390 A | 12/1995 | Boddy et al. | |
| 5,483,385 A | 1/1996 | Boddy | |
| 5,546,239 A | 8/1996 | Lewis | |
| 5,684,646 A | 11/1997 | Boddy | |
| 6,024,459 A | 2/2000 | Lewis | |
| 6,130,514 A * | 10/2000 | Oesterholt et al. .......... | 318/438 |
| 6,213,609 B1 | 4/2001 | Foote et al. | |
| 6,390,630 B1 * | 5/2002 | Ochs .......................... | 359/841 |
| 6,439,730 B1 | 8/2002 | Foote et al. | |
| 6,505,944 B1 | 1/2003 | Lewis | |
| 6,598,983 B1 | 7/2003 | Boddy | |
| 6,648,481 B2 | 11/2003 | Lewis | |
| 6,799,856 B2 | 10/2004 | Foote et al. | |
| 6,820,987 B1 | 11/2004 | Lewis | |
| 6,896,385 B2 | 5/2005 | Foote | |
| 6,979,091 B2 * | 12/2005 | Ichikawa .................... | 359/872 |
| 2004/0165295 A1 | 8/2004 | Lewis | |
| 2005/0030652 A1 | 2/2005 | Lewis | |

* cited by examiner

*Primary Examiner*—Alessandro Amari
*Assistant Examiner*—Mark Consilvio
(74) *Attorney, Agent, or Firm*—McGarry Bair PC

(57) ABSTRACT

A vehicular mirror system comprises a base frame attached to a motor vehicle and a support frame supporting a reflective element assembly and pivotally attached to the base frame for pivoting the reflective element assembly between a folded position and an unfolded position. A detent assembly intercommunicating the support frame and the base frame comprises a plurality of spaced bosses and recesses positioned at different radii and enabling pivoting of the support frame with minimal vertical displacement of the support frame relative to the base frame.

9 Claims, 15 Drawing Sheets

VEHICLE MIRROR SYSTEM WITH CONTROL RISE DETENT ASSEMBLY

CROSS-REFERENCE TO RELATED APPLICATION

This application claims the benefit of U.S. provisional application Ser. No. 60/522,607, filed Oct. 20, 2004, which is incorporated herein in its entirety.

FIELD OF THE INVENTION

The invention relates to an external rearview mirror system for a vehicle, and more particularly to a rear view mirror system which can pivot between an unfolded and a folded position.

DESCRIPTION OF THE RELATED ART

Externally mounted vehicular rearview mirror systems are well known for providing the operator of a vehicle with a rearward view. Such mirror systems typically comprise a base mounted to the vehicle, and a reflective element assembly which is pivotally connected to the base. The pivot connection enables the reflective element assembly to be pivoted between an unfolded, operable position, and a folded position against the vehicle. The pivot connection typically utilizes a spring assembly to urge the reflective element assembly against the base.

The pivot connection frequently incorporates a detent assembly to assist in selectively retaining the mirror in the unfolded and folded positions. When the reflective element assembly is moved from one position to the other, the reflective element assembly will move out of the detent position until the selected position is reached, when the detent assembly is a reengaged. The movement of the reflective element assembly out of the detent position typically results in a relative vertical movement between the reflective element assembly and the base. This vertical movement is resisted by the spring assembly, which imposes an increasing force between the reflective element assembly and the base as the magnitude of the vertical displacement increases. As a result, there is an increasing force resisting the movement of the reflective element assembly, and accelerated wear of parts which are in movable contact with each other. This accelerated wear can result over time in loosening of the fit between the reflective element assembly and the base, which can contribute to unacceptable vibration of the reflective element assembly. Additionally, the vertical displacement must be accommodated in the housing containing the pivot connection, increasing the cost and weight of the mirror system.

SUMMARY OF THE INVENTION

In one aspect, the invention relates to a mirror system comprising a reflective element assembly which is pivotable between an unfolded position and a folded position, comprising a base having a pivot assembly having a pivot center and comprising a first set of bosses and recesses spaced a first radial distance away from the pivot center; and a second set of bosses and recesses spaced at least one radial distance from the pivot center which is different than the first radial distance. The first set of bosses and recesses thereby engage cooperatively with each other in the unfolded position to maintain the reflective element assembly in the unfolded position, and during manual overtravel, the first set of bosses and recesses is moved out of engagement and the second set of bosses and recesses assumes the support of the reflective element assembly from the first set of bosses and recesses.

In another aspect, the invention relates to a mirror system comprising a base adapted to be attached to a vehicle outer body, the base having a mounting surface comprising a pivotal mounting having a longitudinal axis; and a mirror assembly received on the pivotal mounting in juxtaposed relationship to the mounting surface for movement between a folded position and an unfolded position with respect to the base. One of the mirror and the base can comprise a first stop located a first radial stop distance from the pivotal mounting and a first detent located a first radial detent distance from the pivotal mounting, and the other of the mirror and the base can comprise a first annular slot aligned with the first stop and a first detent recess radially aligned with the first detent. Thus, when the mirror assembly is pivotally mounted to the base, the first stop can be received within the first annular slot and the first detent can be received within the first detent recess to maintain the mirror assembly in at least one of the folded and unfolded positions with respect to the base.

Various other embodiments of the invention are also contemplated. For example, the second set of recesses can have first ends and second ends, and wherein each end can have a wall defining an end of travel range. As the reflective element assembly is moved between the folded and unfolded positions, the second set of bosses thereby abut a wall and are prevented from further movement within the second set of recesses.

The second set of recesses can comprise annular slots spaced at least one radial slot distance from the pivot center. The first set of recesses can be spaced at least one radial detent distance from the pivot center. The at least one radial slot distance can be different from the at least one radial detent distance. The base can define a periphery, and the at least one radial detent distance can define a circular path that extends beyond the periphery of the base. The at least one radial slot distance can comprise two radial slot distances. The two radial slot distances can be unequal. The sum of the two radial slot distances can define a couple distance, whereby resistance to a force urging the reflective element assembly beyond one of the folded position and the unfolded position can be increased. The base can define a periphery, and the first detent defines a circular path concentric with the longitudinal axis that extends beyond the periphery of the base.

DESCRIPTION OF AN EMBODIMENT OF THE INVENTION

Described hereinafter is a mirror system which is pivotable between an unfolded or "home" position and a folded position. The mirror system comprises a base having a pivot assembly having a first set of bosses and recesses spaced a first radial distance away from the pivot center, and a second set of bosses and recesses spaced at least one radial distance from the pivot center which is different than the first radial distance. The first set of bosses and recesses cooperate with each other in the home position to maintain the mirror system in the home position. During manual overtravel, the first set of bosses and recesses is moved out of engagement and the second set of bosses and recesses assume the support of the reflective element assembly from the first set of bosses and recesses. This transfer of support is helpful because it moves support of the reflective element assembly with respect to the base from a wider distance to a narrower distance (essentially moving the support of the reflective element assembly within the entire "footprint" of the reflective element assembly during this overtravel rather than the wider, and more stable support of the first set of bosses and recesses).

Figure 1:
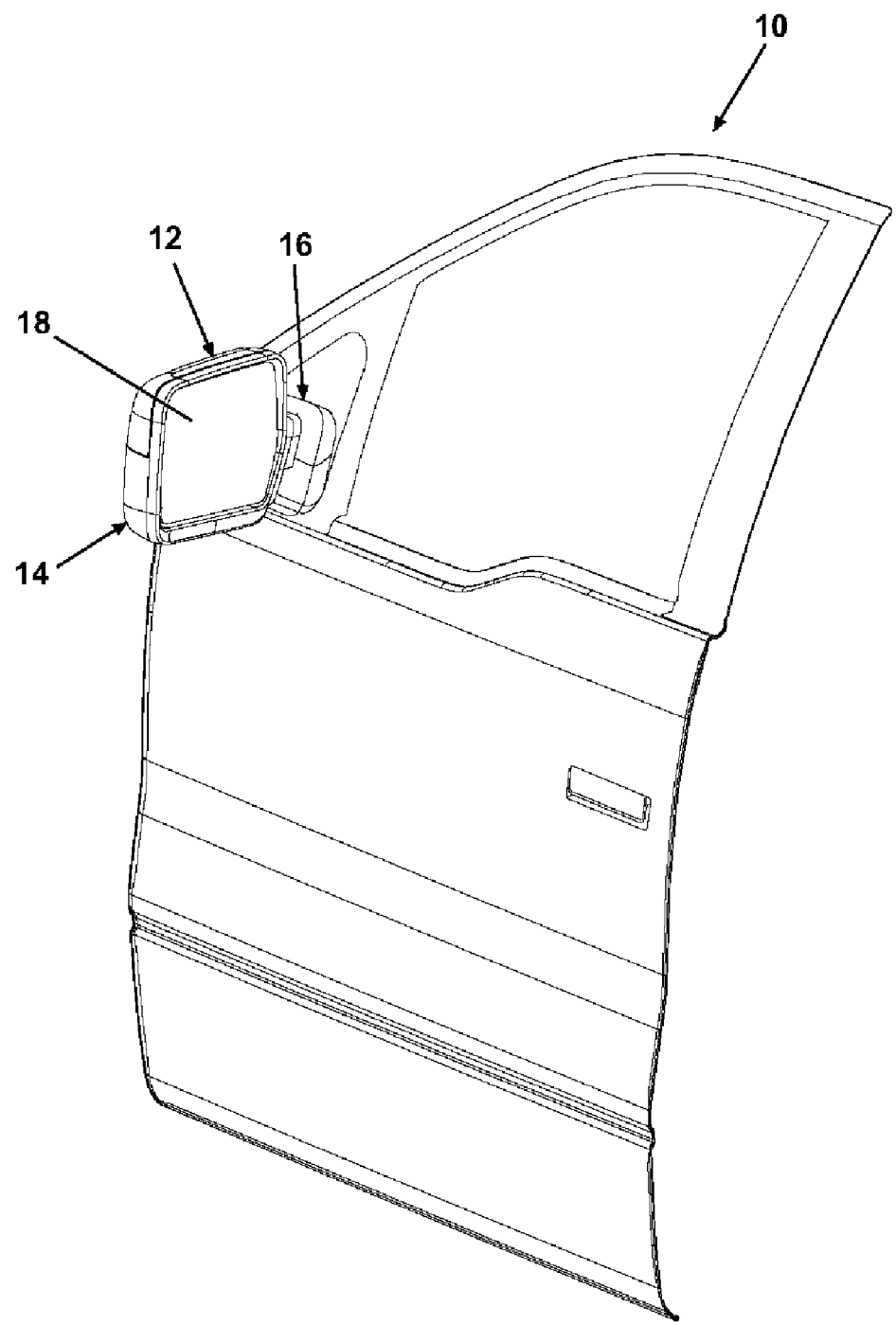
FIG. 1 is a perspective view of a portion of a motor vehicle having an attached external rearview mirror system according to the invention.
Figure 2:
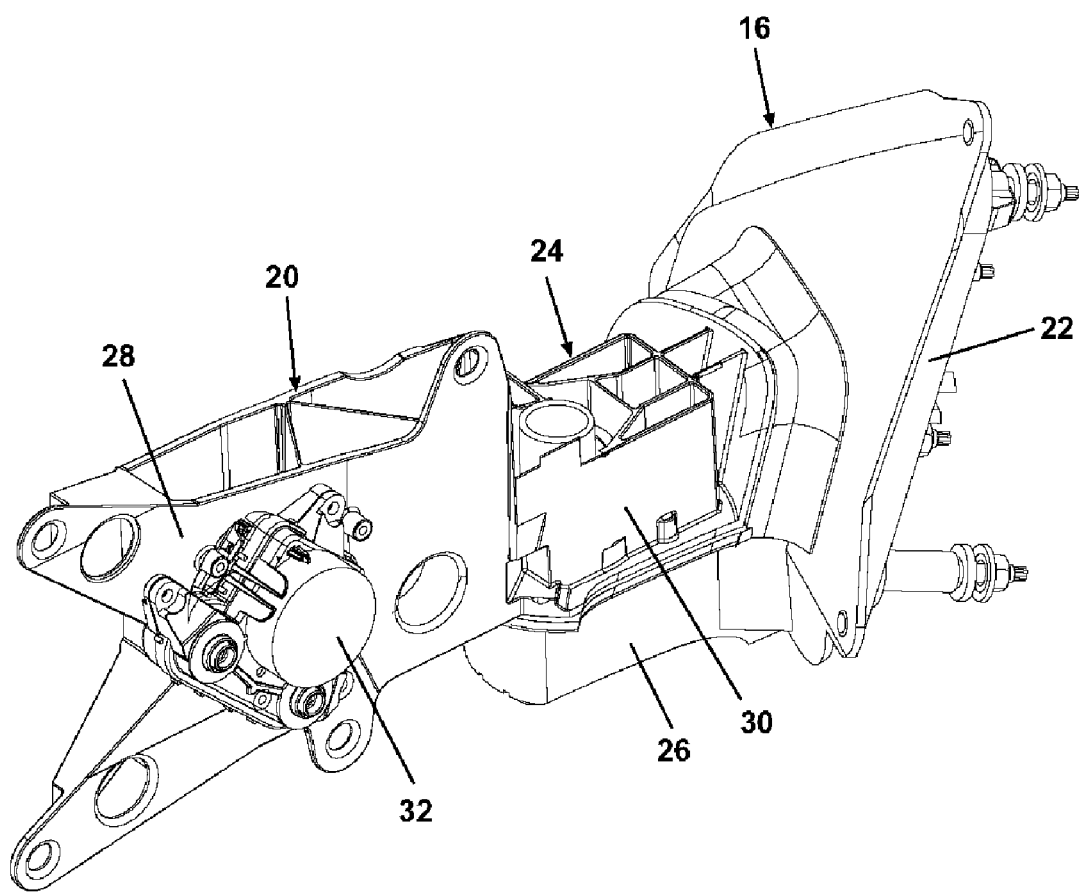
FIG. 2 is a first perspective view of a pivotally interconnected base assembly and reflective element support frame comprising a portion of the rearview mirror system illustrated in FIG. 1, with portions of the rearview mirror system removed for clarity.
Figure 3:
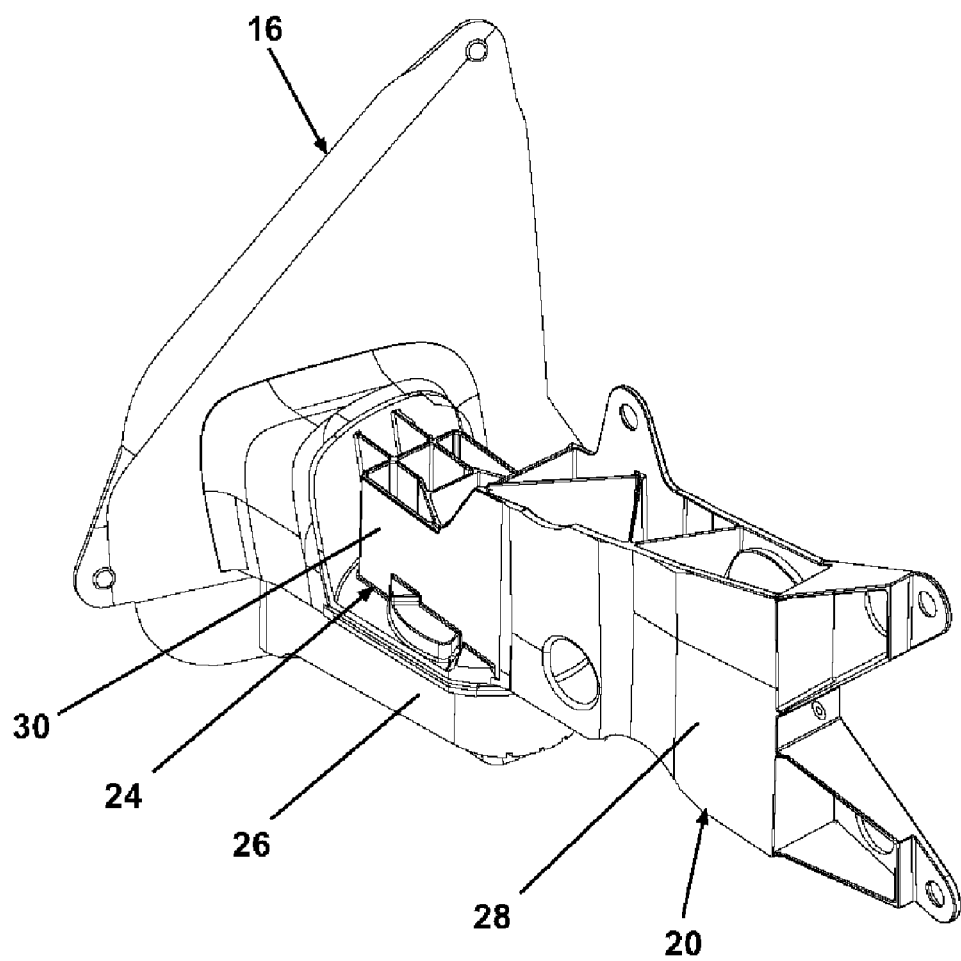
FIG. 3 is a second perspective view of the base assembly and reflective element support frame illustrated in FIG. 2.

Referring now to the Figures, and in particular to FIG. 1, a vehicle 10 is illustrated having a mirror system 12 according to the invention attached thereto, and comprising a reflective element assembly 14 supported by a base assembly 16 attached to the vehicle 10. The reflective element assembly 14 supports a reflective element 18 for providing the operator of the vehicle 10 with a rearward view. The mirror system 12 will be recognized as a generally conventional rearview mirror system in many respects, except as otherwise described herein. The mirror system 12 can share one or more elements of a well-known vehicle rearview mirror system, including a tilt actuator assembly 32 (FIG. 2), a bezel, and a reflective element carrier, which are generally well-known and will not be further described herein. Both the base assembly 16 and the reflective element assembly 14 are enclosed within housings and, as illustrated in FIGS. 2 and 3, comprise a base frame 22 and a support frame 20, respectively, interconnected by a pivot assembly 24. The support frame 20 comprises a reflective element portion 28 to which is attached the tilt actuator assembly 32 and a pivot portion 30. The pivot portion 30 is supported on a cantilever arm 26 comprising a portion of the base frame 22.

Figure 4:
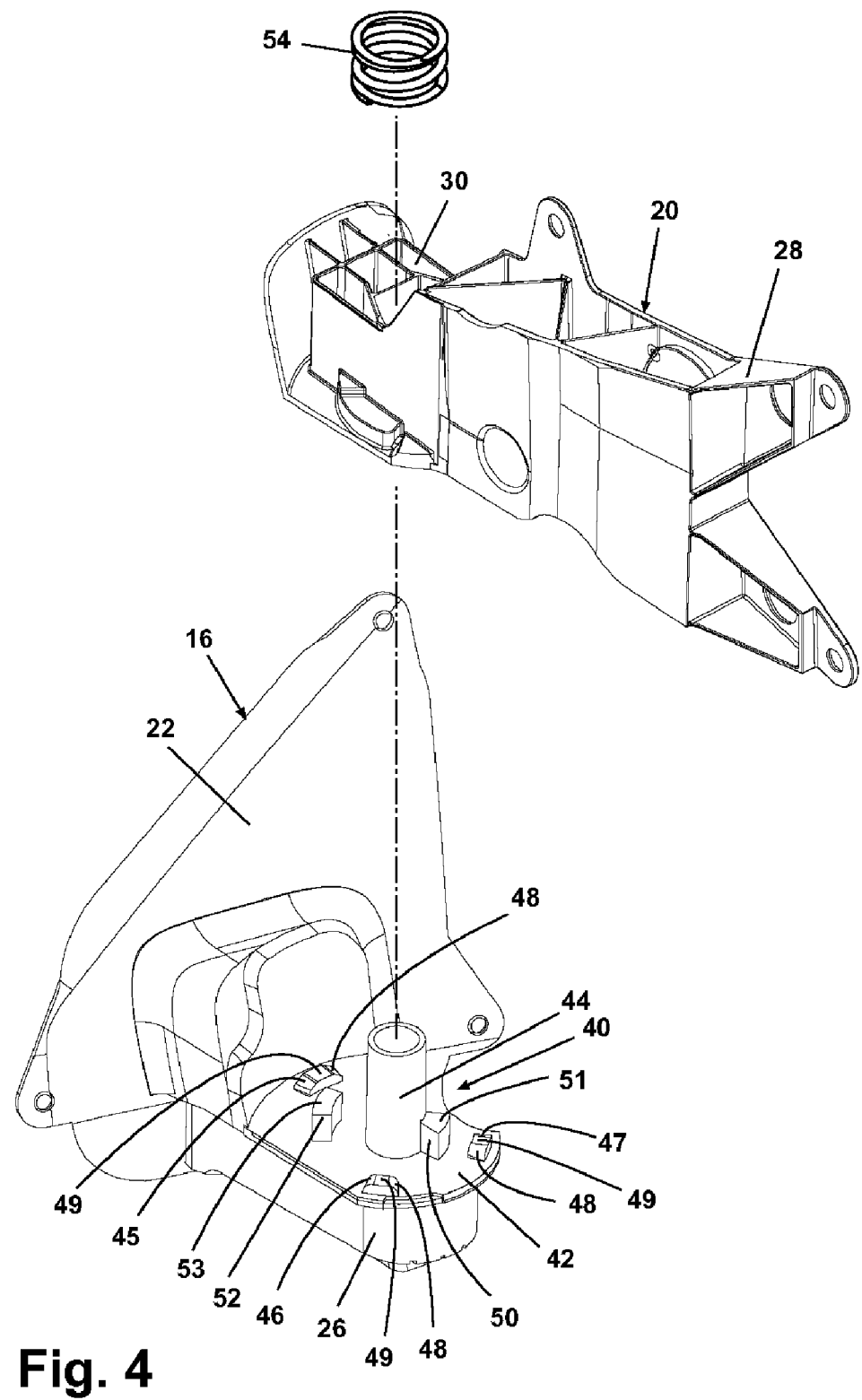
FIG. 4 is an exploded view of the base assembly and reflective element support frame illustrated in FIG. 2.
Figure 5:
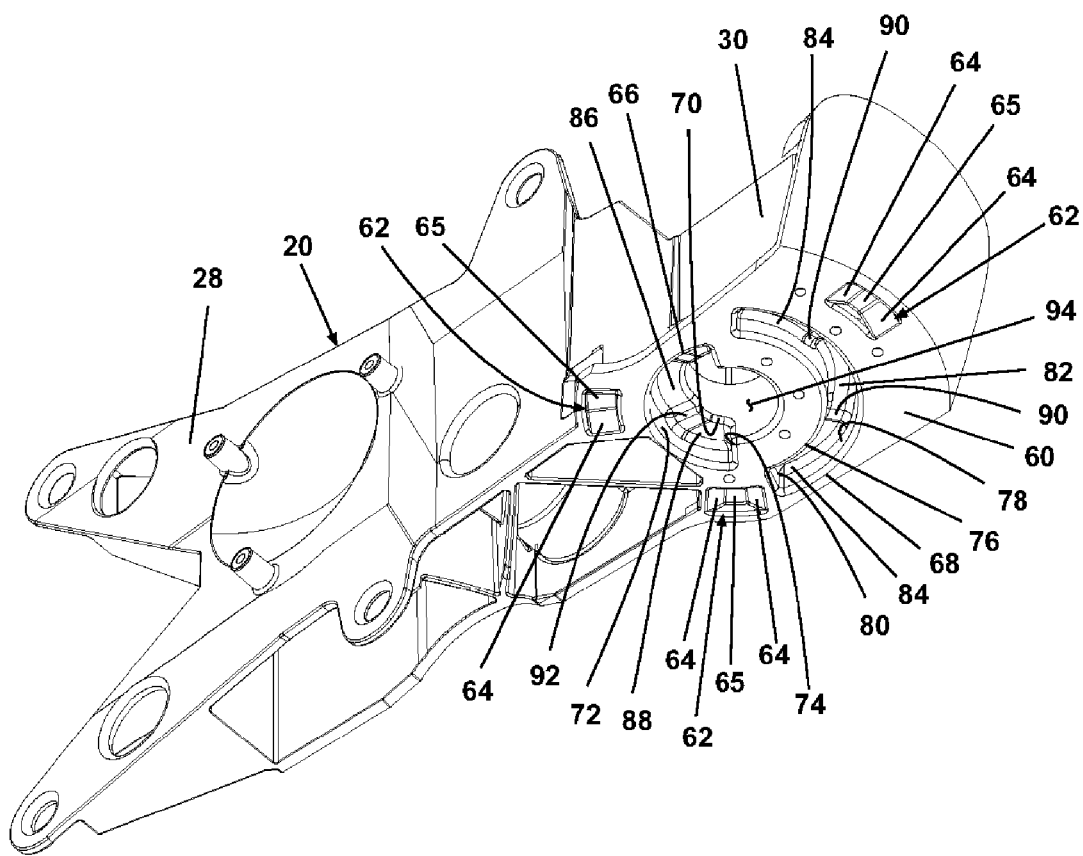
FIG. 5 is a perspective view of the underside of the reflective element support frame illustrated in FIG. 2.
Figure 6:
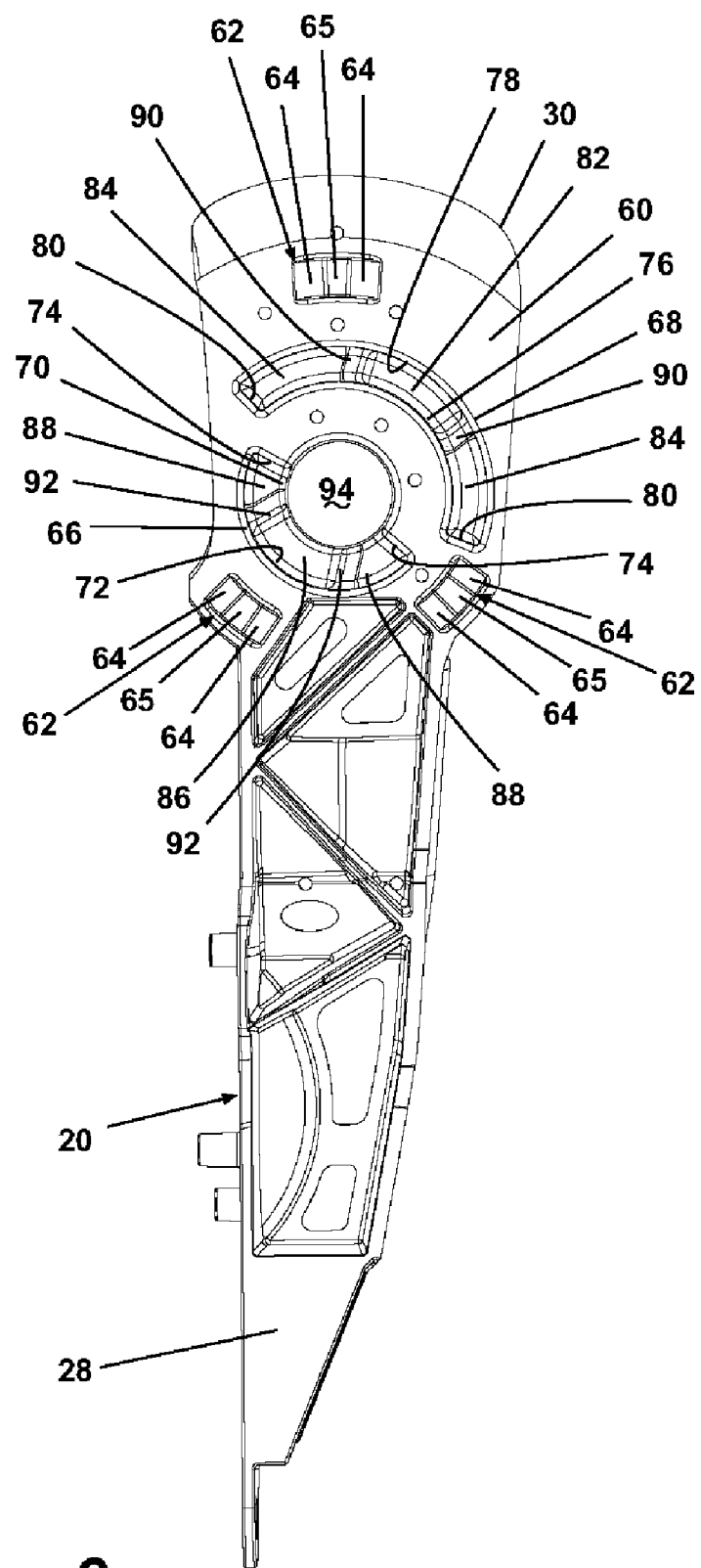
FIG. 6 is a plan view of the underside of the reflective element support frame illustrated in FIG. 5.

Referring now to FIGS. 4-6, the cantilever arm 26 comprises a base pivot portion 40 having a generally planar floor 42 adapted for generally horizontal orientation when the mirror system 10 is attached to the vehicle 12, and defining an irregularly-shaped periphery. Extending orthogonally away from the floor 42 is an annular pivot post 44 defining a concentric longitudinal axis. The pivot post 44 can be cylindrical or preferably slightly tapered in the general form of a truncated cone.

The pivot portion 30 of the support frame 20 is provided with an aperture 94 therethrough adapted for slidable communication with the pivot post 44. Surrounding the aperture 94 is a planar wall 60 adapted for parallel register with the floor 42 when the support frame 20 is attached to the cantilever arm 26. A spring 54 is adapted for slidable insertion over the pivot post 44 with the pivot post 44 inserted through the aperture 94 to urge the pivot portion 30 of the support frame 20 against the cantilever arm 26. A suitable fastener, such as a friction nut (not shown), can be inserted over the pivot post 44 to provide a bearing surface for the spring 54 which, when compressed, will exert a force against the wall 60 toward the cantilever arm 26.

Extending upwardly from the floor 42 is an array of slightly arcuate, generally trapezoidal detents 45, 46, 47, also referred to hereinafter as bosses, in radially-spaced juxtaposition with the pivot post 44. FIGS. 4 and 7 illustrate a preferred array comprising three bosses 45, 46, 47. Two of the bosses 46, 47 are spaced from the longitudinal axis of the pivot post 44 at a first radial detent distance, and the third boss 45 is spaced from the longitudinal axis of the pivot post 44 at a second radial detent distance greater than the first radial detent distance. Each boss 45, 46, 47 comprises a pair of opposed inclined faces 48 extending from the floor 42 to transition to a medial upper face 49 parallel to and spaced above the floor 42. The upper face 49 of each boss 45, 46, 47 is spaced an equal distance above the floor 42.

Extending upwardly from the floor 42 is a truncated circular sector shaped inner stop or boss 50 in cooperative communication with the pivot post 44, and spaced from the longitudinal axis of the pivot post 44 a first radial stop distance. The inner boss 50 terminates in a planar upper face 51 spaced above and parallel to the floor 42. Extending upwardly from the floor 42, and spaced a second radial stop distance away from the longitudinal axis of the pivot post 44, is a truncated circular sector shaped outer stop or boss 52 in radial juxtaposition with the inner boss 50. The outer boss 52 terminates in a planar upper face 53. The height of the outer boss 52 above the floor 42 is equal to the height of the inner boss 50 above the floor 42, and the height of each boss 50, 52 is greater than the height of the trapezoidal bosses 45, 46, 47.

Referring specifically to FIGS. 5 and 6, a plurality of recesses 62 are formed in the wall 60 for cooperative register with the trapezoidal bosses 45, 46, 47. FIG. 6 illustrates a preferred array comprising three recesses 62. Each recess 62 comprises a slightly arcuate, generally trapezoidal depression in radially spaced juxtaposition with the aperture 94. Two of the recesses 62 are spaced from the aperture 94 at a first radial distance, and the third recess 62 is spaced from the aperture 94 at a second radial distance greater than the first radial distance. Each recess 62 comprises a pair of opposed inclined faces 64 extending from the wall 60 to transition to a medial recess face 65 parallel to and spaced inwardly from the wall 60. The recess face 65 of each recess 62 is spaced an equal distance away from the wall 60. Each recess 62 has a configuration complementary to a cooperating boss 45, 46, 47 to receive the boss 45, 46, 47 therein.

Extending inwardly from the wall 60 is a truncated circular sector shaped inner annular slot 66 in cooperative communication with the aperture 94. Also extending inwardly from the wall 60, and spaced a radial slot distance away from the aperture 94, is a truncated circular sector shaped outer annular slot 68 in radial juxtaposition with the inner annular slot 66. The slots 66, 68 are adapted with a configuration complementary to the inner boss 50 and the outer boss 52, respectively, to receive the bosses 50, 52 therein, and can be located at the same or different radial slot distances away from the concentric longitudinal axis of the aperture 94.

The inner annular slot 66 comprises an arcuate inner edge 70 defining the transition from the inner annular slot 66 to the aperture 94. An arcuate outer wall 72 is spaced radially away from the aperture 94 and depends generally orthogonally from the wall 60. The arcuate limit of the inner annular slot 66 is defined by a pair of radially oriented end walls 74 extending from the aperture 94 to the arcuate outer wall 72 orthogonal to the wall 60. An arcuate shallow wall 88 extends from each end wall 74 between the inner edge 70 and the outer wall 72 parallel to and spaced away from the wall 60. The shallow walls 88 transition through a pair of inclined walls 92 to a medial deep wall 86 extending between the inner edge 70 and the outer wall 72 at a depth away from the wall 60 somewhat greater than the depth of the shallow walls 88.

The outer annular slot 68 comprises an arcuate inner wall 76 spaced radially away from the aperture 94 and depending generally orthogonally from the wall 60, and an arcuate outer wall 78 spaced radially away from the inner wall 76 and depending generally orthogonally from the wall 60. The arcuate limit of the outer annular slot 68 is defined by a pair of radially oriented end walls 80 extending from the inner wall 76 to the outer wall 78 orthogonal to the wall 60. An arcuate shallow wall 84 extends from each end wall 80 between the inner wall 76 and the outer wall 78 parallel to and spaced away from the wall 60. The shallow walls 84 transition through a pair of inclined walls 90 to a medial deep wall 82 extending between the inner wall 76 and the outer wall 78 at a depth away from the wall 60 somewhat greater than the depth of the shallow walls 84.

The recesses 62 and the slots 66, 68 are adapted so that when the pivot assembly 24 is assembled with the pivot post 44 inserted through the aperture 94 to bring the wall 60 into close communication with the floor 42, the bosses 45, 46, 47, 50, 52 will be received in the recesses 62, 66, 68, respectively. The support frame 20 can be pivoted relative to the base frame 22 between limits defined by the contact of the inner boss 50 with the end walls 74 and the outer boss 52 with the end walls 80.

Figure 7A:
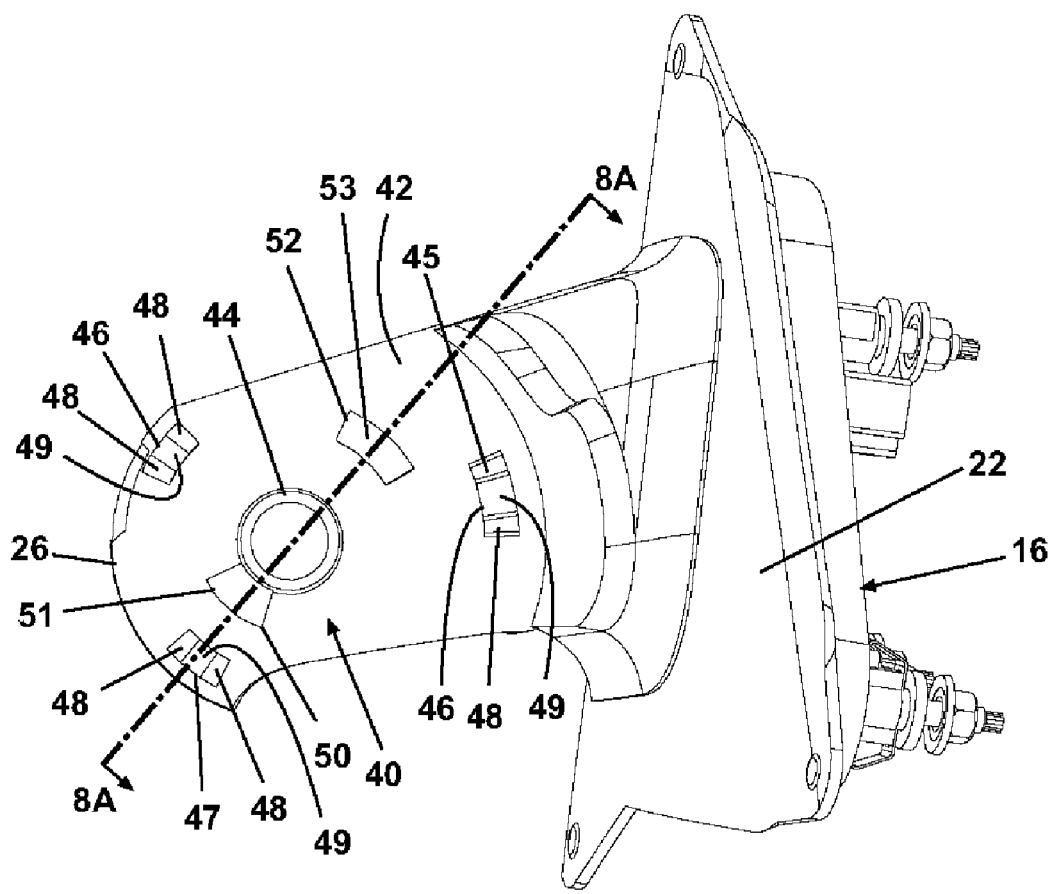
FIG. 7A is a plan view of the upper side of the base assembly illustrated in FIG. 2 showing a view line for defining the views shown in FIGS. 8A, 9A, and 11A.
Figure 7B:
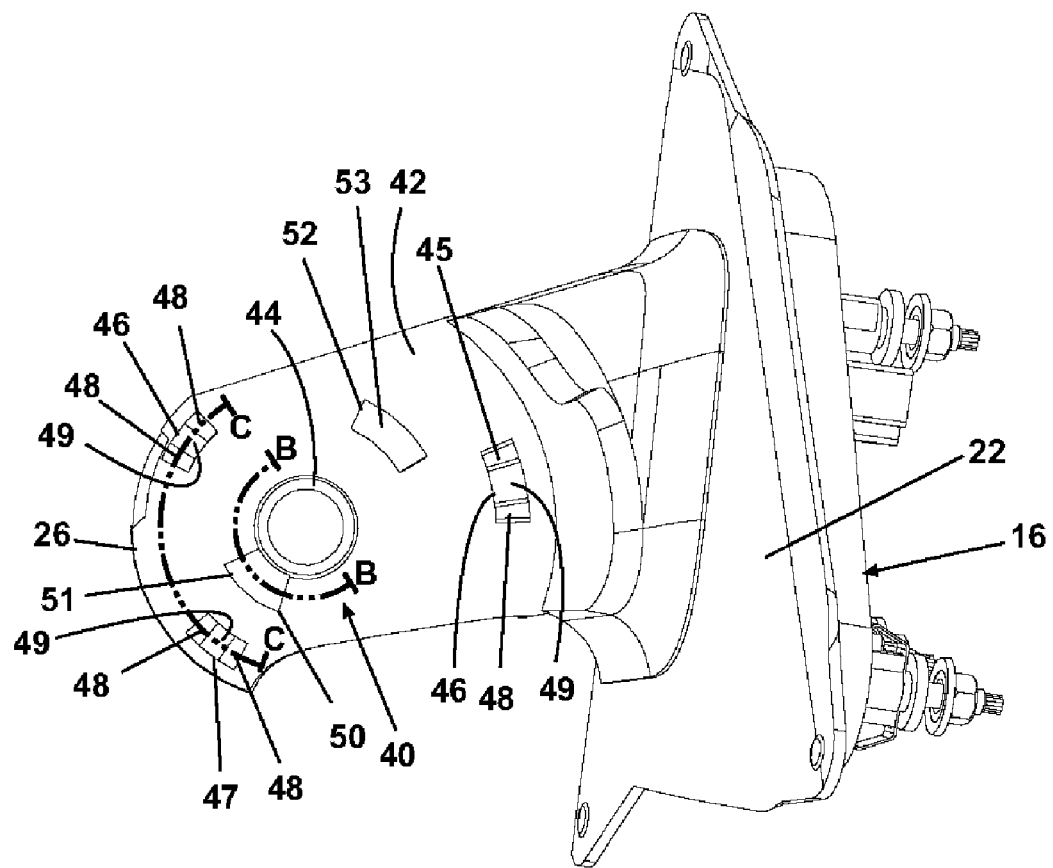
FIG. 7B is a plan view of the upper side of the base assembly illustrated in FIG. 2 showing a pair of curved sectional lines for defining the views shown in FIGS. 8B-C, 9B-C, and 11B-C.
Figure 8A:
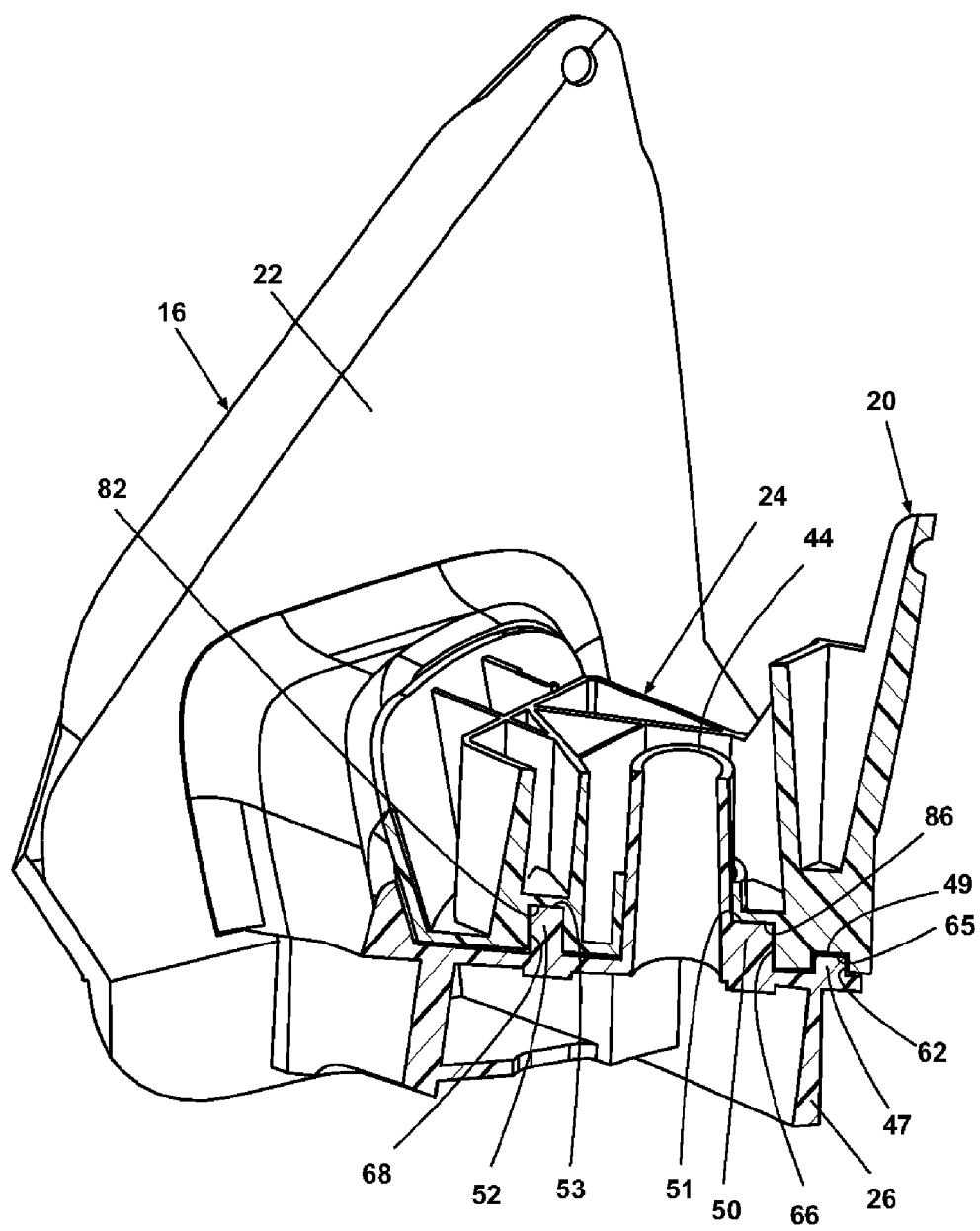
FIG. 8A is a sectional view of the base assembly and reflective element support frame with the support frame in a first unfolded position taken along view line A-A of FIG. 7A.
Figure 8B:
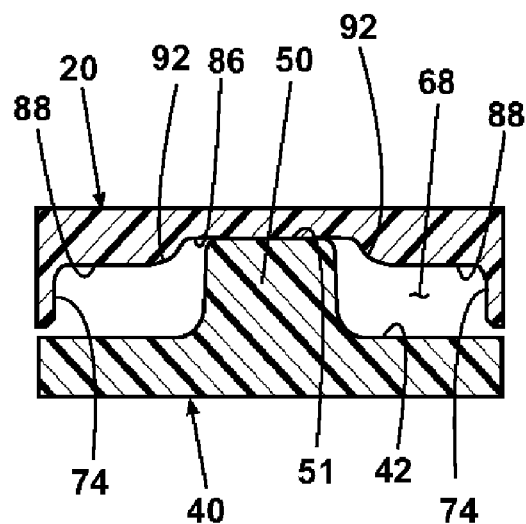
FIG. 8B is a flattened sectional view taken along curved sectional line B-B of FIG. 7B illustrating the first unfolded position shown in FIG. 8A.
Figure 8C:
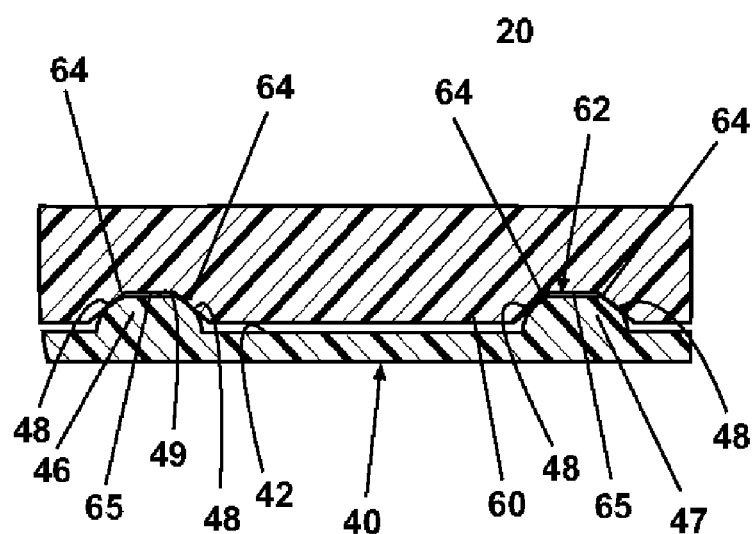
FIG. 8C is a flattened sectional view taken along curved sectional line C-C of FIG. 7B illustrating the first unfolded position shown in FIG. 8A.
Figure 9A:
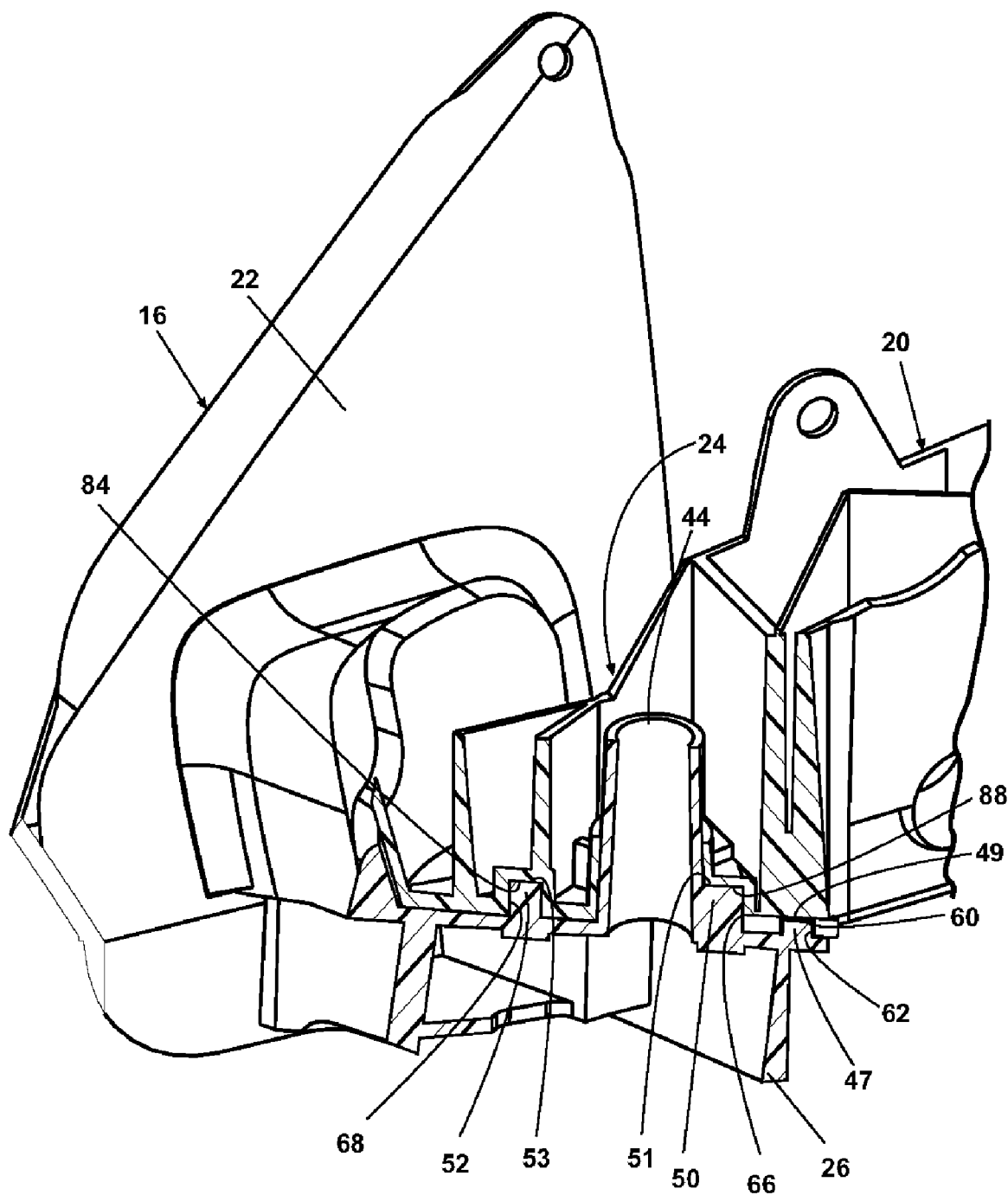
FIG. 9A is a sectional view of the base assembly and reflective element support frame with the support frame in a first folded position rearward of the base assembly taken along view line A-A of FIG. 7A.
Figure 9B:
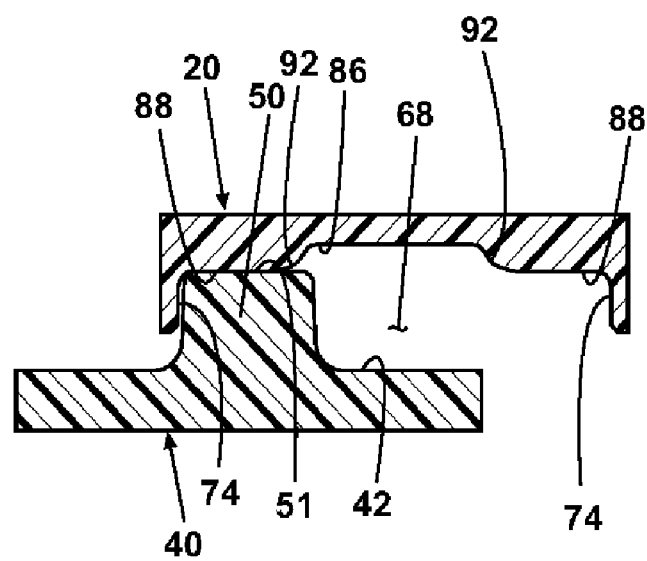
FIG. 9B is a flattened sectional view taken along curved sectional line B-B of FIG. 7B illustrating the first folded position shown in FIG. 9A.
Figure 9C:
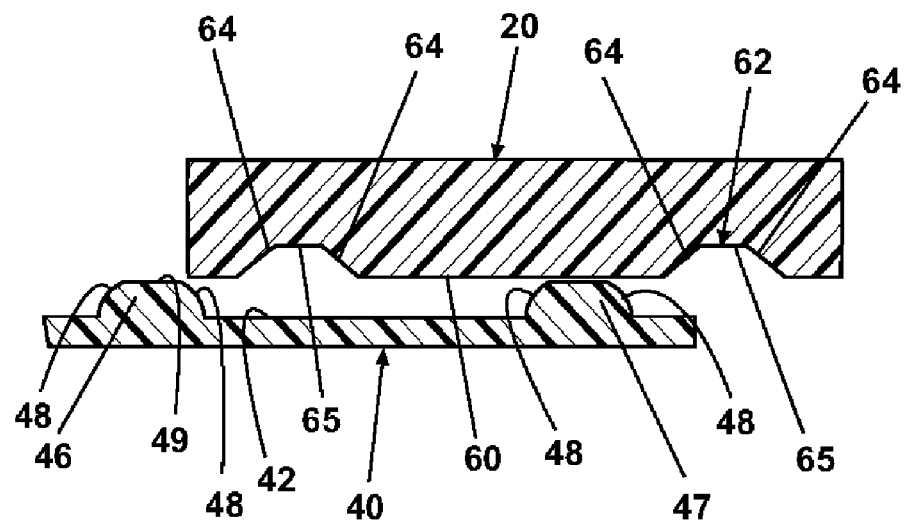
FIG. 9C is a flattened sectional view taken along curved sectional line C-C of FIG. 7B illustrating the first folded position shown in FIG. 9A.
Figure 11A:
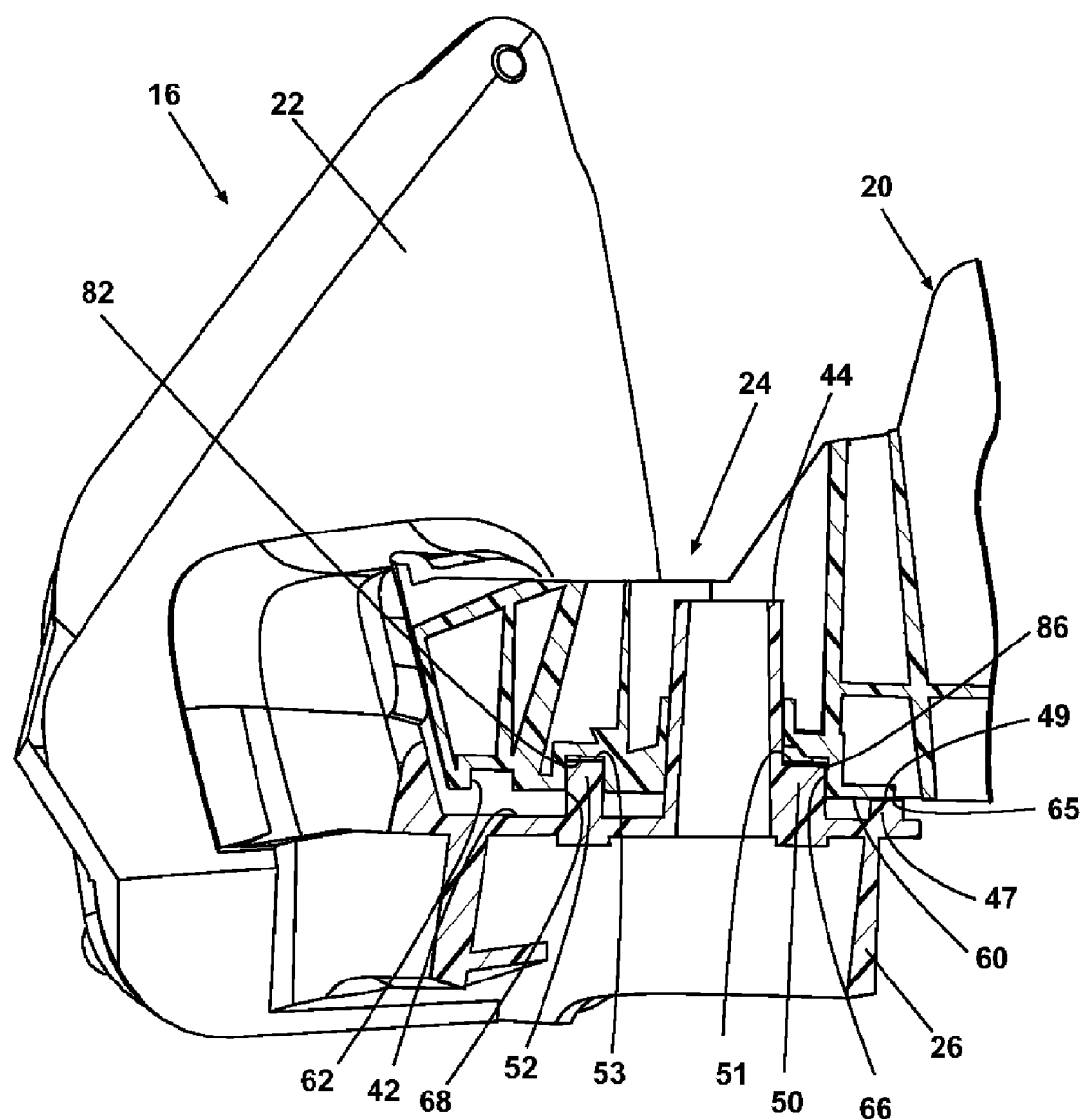
FIG. 11A is a sectional view of the base assembly and reflective element support frame with the support frame in a partially unfolded position intermediate the positions shown in FIGS. 8A and 9A taken along view line A-A of FIG. 7A.
Figure 11B:
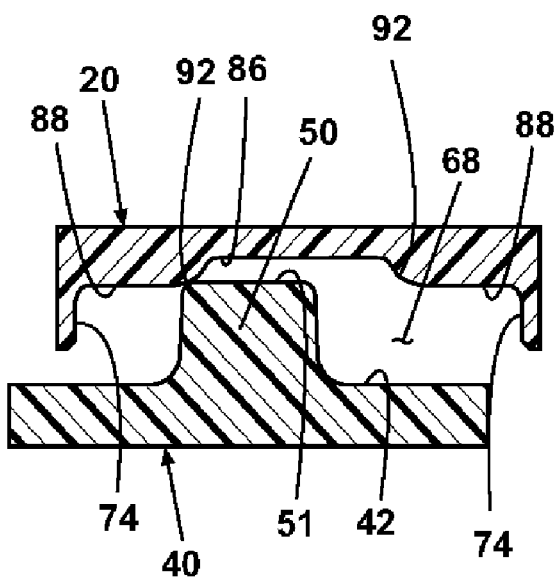
FIG. 11B is a flattened sectional view taken along curved sectional line B-B of FIG. 7B illustrating the partially unfolded position shown in FIG. 11A.
Figure 11C:
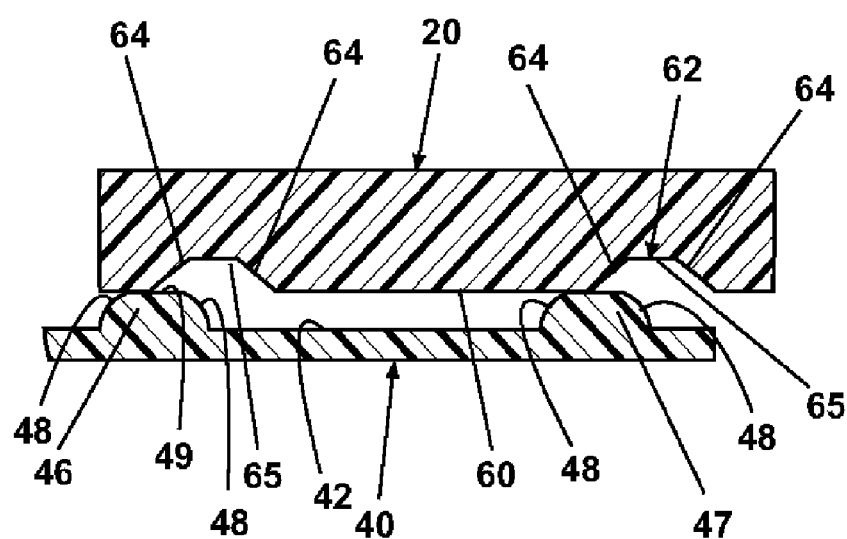
FIG. 11C is a flattened sectional view taken along curved sectional line C-C of FIG. 7B illustrating the partially unfolded position shown in FIG. 11A.

FIG. 7A illustrates the base assembly 16 with a superimposed view line A-A orienting the sectional views of the pivot assembly 24 illustrated in FIGS. 8A, 9A, and 11A. FIG. 7B illustrates the base assembly 16 with superimposed curved view lines B-B and C-C orienting the views of the pivot assembly 24 illustrated in FIGS. 8B, 9B, and 11B, and 8C, 9C, and 11C, respectively. The views illustrated in FIGS. 8B, 9B, and 11B are sectional views of the inner boss 50 and the inner annular slot 66 (illustrated in FIG. 6) taken along curved view line B-B, but with the views flattened into a 2-dimensional view from the curved 3-dimensional configuration of the inner boss 50 and the inner annular slot 66. Similarly, the views illustrated in FIGS. 8C, 9C, and 11C are sectional views of the bosses 46, 47 and the recesses 62 (illustrated in FIG. 6) taken along curved view line C-C, but with the views flattened into a 2-dimensional view from the curved 3-dimensional configuration of the bosses 46, 47 and the recesses 62. The views in FIGS. 8B-C, 9B-C, and 11B-C are radially inward, toward the pivot post 44.

FIG. 8A illustrates a cross-section of the pivot assembly 24 along view line A-A of FIG. 7A. FIGS. 8B and 8C illustrate the configuration of the pivot assembly 24 shown in FIG. 8A corresponding to flattened view lines B-B and C-C, respectively of FIG. 7B. For purposes of FIGS. 8A-C, the support frame 20 is illustrated aligned with the base frame 22 so that the support frame 20 is in a fully unfolded configuration such as would be utilized during operation of the vehicle 10. In the unfolded configuration illustrated in FIGS. 8A-C, it can be seen that the bosses 46, 47 are received in the recesses 62, with their upper faces 49 spaced somewhat away from the recess faces 65. The boss 45 (not shown) will similarly be received in its respective recess 62, with its upper face 49 spaced somewhat away from the recess face 65. Additionally, the inner boss 50 is fully received in the inner annular slot 66, with the upper face 51 of the inner boss 50 in contact with the deep wall 86 of the slot 66. Finally, the outer boss 52 (shown in FIG. 8A) is fully received in the outer annular slot 68, with the upper face 53 of the outer boss 52 in contact with the deep wall 82 of the slot 68. It can be seen from FIG. 8C that the upper face 49 of the bosses 46, 47 is spaced away from the recess face 65 by contact of the inclined faces 48 of the bosses 46, 47 with the inclined faces 64 of the recesses 62. This separation reduces the frictional force between the bosses 45-47 and the recesses 62, facilitating movement of the bosses 45-47 out of the recesses 62 and reducing the potential for the pivot assembly 24 to "hang up."

FIG. 9A illustrates a cross-section of the pivot assembly 24 along view line A-A of FIG. 7A, illustrating the support frame 20 in a fully folded configuration rearward of the base frame 22. FIGS. 9B and 9C illustrate the configuration of the pivot assembly 24 shown in FIG. 9A corresponding to flattened view lines B-B and C-C, respectively of FIG. 7B. In this folded configuration, it can be seen that the bosses 46, 47 are no longer received in the recess 62, and their upper faces 49 are spaced somewhat away from the wall 60. The boss 45 (not shown) will similarly not be received in its respective recess 62. Additionally, the inner boss 50 is fully received in the inner annular slot 66, with the upper face 51 of the inner boss 50 in contact with the shallow wall 88 of the slot 66. Finally, the outer boss 52 (shown in FIG. 9A) is fully received in the outer annular slot 68, with the upper face 53 of the outer boss 52 in contact with the shallow wall 84 of the slot 68. Each boss 50, 52 will also be in a stop position resulting from contact of the boss 50, 52 with an end wall 74, 80 of the annular slot 66, 68, respectively. The contact of the bosses 50, 52 with the shallow walls 88, 84, respectively, are responsible for the "lifting" of the support frame 20 away from the base pivot portion 40, which raises the wall 60 relative to the floor 42 and the upper faces 49.

Figure 10:
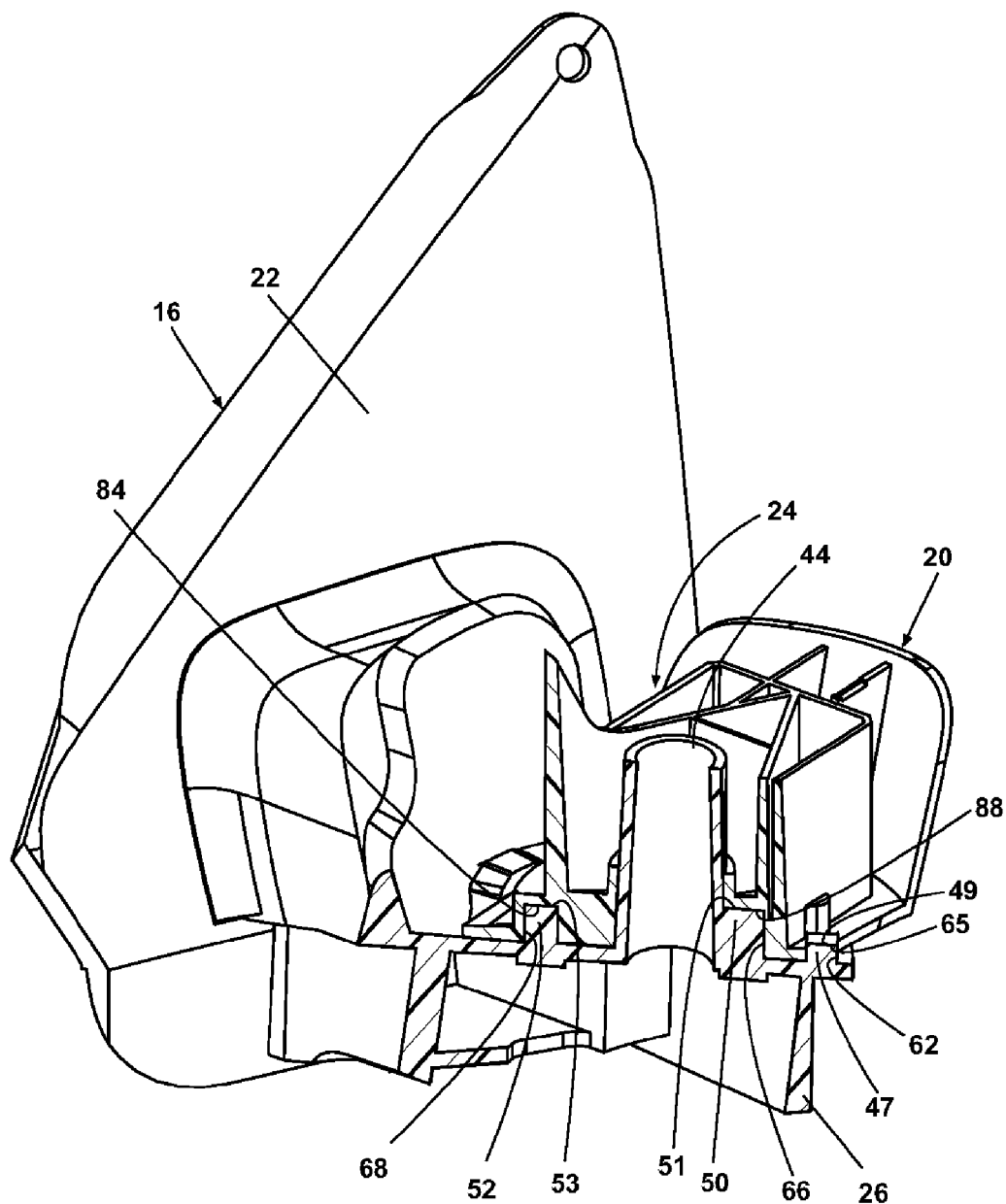
FIG. 10 is a sectional view of the base assembly and reflective element support frame with the support frame in a second folded position forward of the base assembly taken along view line A-A of FIG. 7A.

FIG. 10 illustrates a cross-section of the pivot assembly 24 along view line A-A of FIG. 7A, illustrating the support frame 20 in a fully folded configuration forward of the base frame 22. In this folded configuration, it can be seen that the boss 47 is received in the recess 62, with the upper face 49 spaced away from the recess face 65. The other two bosses 45, 46 (not shown) will not be received in the recesses 62. The inner boss 50 is fully received in the inner annular slot 66, with the upper face 51 of the inner boss 50 in contact with the shallow wall 88 of the slot 66. The outer boss 52 is fully received in the outer annular slot 68, with the upper face 53 of the outer boss 52 in contact with the shallow wall 84 of the slot 68. Each boss 50, 52 will be in a stop position resulting from contact of the boss 50, 52 with an end wall 74, 80 of the annular slot 66, 68, respectively. The gap between the upper face 49 of the boss 47 and the recess face 65 is a result of the bosses 50, 52 engaging the shallow walls 88, 84, respectively, thereby maintaining the support frame 20 away from the base pivot portion 40 of the base frame 22.

FIG. 11A illustrates a cross-section of the pivot assembly 24 along view line A-A of FIG. 7A, illustrating the support frame 20 in a partially folded configuration intermediate the fully unfolded configuration of FIGS. 8A-C and the fully folded configuration of FIGS. 9A-C. FIGS. 11B and 11C illustrate the configuration of the pivot assembly 24 shown in FIG. 11A corresponding to flattened view lines B-B and C-C, respectively, of FIG. 7B. In this configuration, it can be seen that the bosses 46, 47 are no longer received in the recesses 62. Rather, the upper face 49 is in contact with the wall 60 of the support frame 20, thereby maintaining the support frame 20 away from the base frame 22. The boss 45 will similarly not be received in its respective recess 62. The inner boss 50 is transitioning from the deep wall 86 to the shallow wall 88 along the inclined wall 92 of the inner annular slot 66, and the outer boss 52 is transitioning from the deep wall 82 to the shallow wall 84 along the inclined wall 90 of the outer annular slot 68. The upper face 51 of the inner boss 50 and the upper face 53 of the outer boss 52 will be spaced in part away from the deep walls 86, 82, respectively, as the bosses 50, 52 move along the inclined walls 92, 90, respectively. The wall 60 of the support frame 20 will continue to move away from the upper faces 49 of the bosses 45, 46, 47 until the configuration shown in FIGS. 9A-C is reached.

The pivot assembly described herein offers several advantages. The location of the bosses and recesses at increased radial distances from the pivot center provides a more "spread out" configuration, thereby providing a more stable base for the reflective element assembly. The increased radial distances also provide a wider base for mounting the reflective element assembly. The bosses and recesses have a lower tendency to "lock up" during pivoting of the assembly.

The spacing of the bosses provides more room for the stop system by moving the bosses out to a larger radius. This enables the use of two stops rather than one, at least doubling the force the stop can resist, and potentially increasing the resisting force by a factor of 5. Locating the stops at different radii also enables greater arcuate travel if necessary with two stops, without removing or reducing structurally important stop "buttressing material".

The "larger stance" provided by the larger radius configuration decreases vibration and increases the structural integrity of the mirror system. Also, the transfer of biasing force from the 3 outer bosses to the 2 inner bosses removes the possibility of "hang-ups" when the outer bosses move into the recesses from the horizontal plane.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A mirror system comprising a reflective element assembly which is pivotable between an unfolded position and a folded position, comprising:
   a base defining a periphery, and having a pivot assembly having a pivot center and comprising:
      a first set of bosses spaced a first radial distance away from the pivot center, and a first set of recesses spaced at least one radial detent distance from the pivot center, the at least one radial detent distance defining a circular path that extends beyond the periphery of the base; and
      a second set of bosses and recesses spaced at least one radial distance from the pivot center which is different than the first radial distance, the recesses having first ends and second ends, wherein each end has a wall defining an end of travel range whereby, as the reflective element assembly is moved between the folded and unfolded positions, the second set of bosses abut a wall and are prevented from further movement within the second set of recesses;
   wherein the first set of bosses and recesses engage cooperatively with each other in the unfolded position to maintain the reflective element assembly in the unfolded position; and
   wherein during manual overtravel of the pivot assembly, the first set of bosses and recesses is moved out of engagement and the second set of bosses and recesses assumes the support of the reflective element assembly from the first set of bosses and recesses.

2. The mirror assembly of claim 1 wherein the second set of contact regions comprises annular slots spaced at least one radial slot distance from the pivot center.

3. The mirror assembly of claim 2 wherein the first set of contact regions are spaced at least one radial detent distance from the pivot center.

4. The mirror assembly of claim 3 wherein the at least one radial slot distance comprises two radial slot distances.

5. The mirror assembly of claim 4 wherein the two radial slot distances are unequal.

6. The mirror assembly of claim 4 wherein the sum of the two radial slot distances defines a couple distance, whereby resistance to a force urging the reflective element assembly beyond one of the folded position and the unfolded position is increased.

7. A mirror system comprising a reflective element assembly which is pivotable between an unfolded position and a folded position, comprising:
   a support frame for supporting a reflective element;
   a base defining a periphery, for attachment to a vehicle, and coupled with the support frame through a pivot assembly having a pivot center, the pivot assembly comprising:

a first set of bosses and contact regions spaced a first radial distance away from the pivot center, the first set of contact regions being spaced at least one radial detent distance from the pivot center, the at least one radial detent distance defining a circular path that extends beyond the periphery of the base; and a second set of bosses and contact regions spaced at least one radial distance from the pivot center which is different than the first radial distance, the second set of contact regions comprising annular slots spaced at least one radial slot distance from the pivot center;

wherein the first and second contact regions each have a first contact surface, and a second contact surface spaced vertically away from the first contact surface; and wherein during pivoting of the support frame relative to the base, the engagement of the first and second set of bosses is transferred between the first contact surfaces and the second contact surfaces to transfer engagement of the first set of bosses with the first set of contact regions to engagement of the second set of bosses with the second set of contact regions.

8. The mirror assembly of claim 7 wherein the second set of contact regions comprises first ends and second ends, and wherein each end has a wall defining an end of travel range, whereby, as the reflective element assembly is moved between the folded and unfolded positions, the second set of bosses abut a wall and are prevented from further movement relative to the second set of contact regions.

9. The mirror assembly of claim 7 wherein the at least one radial slot distance is different from the at least one radial detent distance.

\* \* \* \* \*